Oct. 20, 1931.  B. C. PAINE  1,828,064
ELECTRICAL OUTLET BOX
Filed March 12, 1928

Inventor
Beaumont C. Paine
by Frank J. Schraeder Jr.
Attorney.

Patented Oct. 20, 1931

1,828,064

UNITED STATES PATENT OFFICE

BEAUMONT C. PAINE, OF GLEN ELLYN, ILLINOIS

ELECTRICAL OUTLET BOX

Application filed March 12, 1928. Serial No. 260,933.

This invention relates to improvements in electrical outlet boxes, such as electric switch boxes, outlet boxes for switches, receptacles for wall plugs, and the like.

Among the objects of my invention is to provide a new and useful outlet box having a detachable supporting bracket and a detachable lath holder. The supporting bracket and lath holder may of course be made integral with the outlet box, but their removability renders a wider scope of use and permits their attachment to and use in connection with various other types of boxes or receptacles.

It is also an object of my invention to provide a lath holder of simple construction which shall be readily attachable to boxes and receptacles of the above described character and which will support the ends of the lath adjacent the sides of the box or receptacle to insure a support for the plaster.

With the above and other objects in view, my invention consists in the novel combination, construction, and arrangement of the parts and members shown in the preferred embodiment in the accompanying drawings, described in the following specification, and particularly pointed out in the appended claim.

In the illustrations, Fig. 1 is a front elevation of a part of a wall showing a switch box; the improved features being shown by dashed lines.

Figure 1:
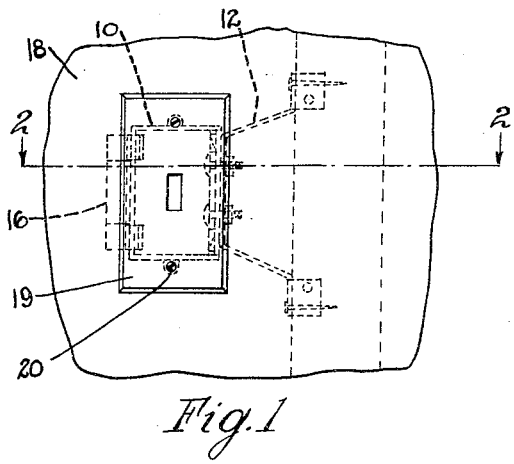
Figure 4:
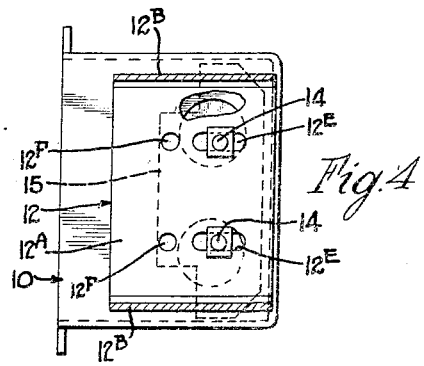
Fig. 4 is an enlarged vertical section taken on line 4—4 of Fig. 3, showing the adjustable feature of the supporting bracket.

Referring now in more detail to the several illustrations, 10 indicates a switch box of known design having an open front for the insertion of a switch, plug or other electrical device and being provided with "knock outs" $10^A$ which as is well known, are portions of the wall almost completely sheared around their circumference to afford their displacement by the knock of a hammer, or the like, to provide entrance openings for electric current conductors or their tubular casings 11.

A bracket 12 is provided to support the box 10 on an adjacent stud 13.

The bracket 12 comprises an intermediate portion $12^A$ having angularly and oppositely disposed portions $12^B$ terminating in integral feet $12^C$ bent or disposed parallelly to the intermediate portion $12^A$. As an additional means for facilitating the support and installation of the bracket 12, the feet $12^C$ may be provided on their aligned sides with right-angularly bent extensions $12^D$ to embrace the outer face of the stud 13.

Since the "knock outs" $10^A$ occur in slightly different locations on the various boxes 10, the intermediate portion $12^A$ may be provided with slotted openings $12^E$ or additional openings $12^F$ for the securing bolts 14.

Figures 5, 6:
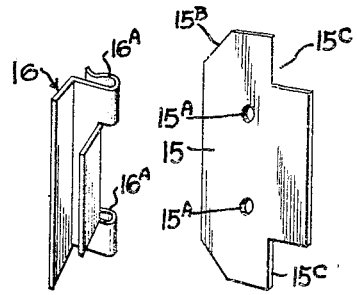
Fig. 5 is an enlarged perspective view of my improved lath holder or support.
Fig. 6 is an enlarged perspective view of a plate member insertable within the box or receptacle to cooperate with the supporting bracket.

The securing bolts 14 pass through the "knock out" openings $10^A$ but are held against movement or cross displacement therein by their insertion and support within the openings $15^A$ of the plate 15. The plate 15 is a comparatively thin steel plate and is insertable within the box 10 and is preferably formed with its inner corners $15^B$ cut off angularly to facilitate its insertion within the box 10. The outer corners $15^C$ may also be cut out as shown in Fig. 6, to clear any structural parts within the boxes 10, as for instance the lugs $10^B$ which may occur in the construction of certain boxes.

Figure 2:
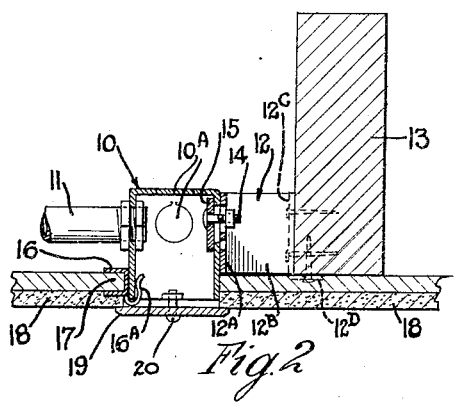
Fig. 2 is a cross section taken on line 2—2 of Fig. 1.
Figure 3:
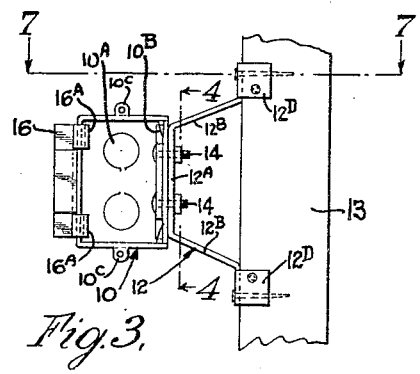
Fig. 3 is a front elevation of my improved switch box shown supported on a stud.
Figure 7:
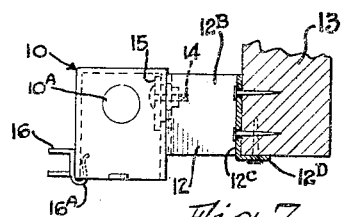
Fig. 7 is a cross section taken on line 7—7 of Fig. 3.

The lath support 16 is made substantially U-shape in cross-section but with the upper and lower portions $16^A$ of one side bent back to form clips, the ends of which may be inserted over the inner face of the box side wall opposite the side wall supported on the bracket 12. It will now be readily apparent that when the lath support 16 is mounted as shown in Figs. 2 and 3, the lath end or ends 17 may be supported within the sides of the U-shaped portion and thus retained during the application of the plaster 18.

It may be noted that adjustment of the box 10 relatively to the outer face of the stud 13 may be readily made by loosening the bolts 14 and slightly shifting the box 10, up and down or laterally as required upon the loosened bolts, since the slotted openings 12$^E$ and comparatively large "knock out" openings 10$^A$ permit such adjustment. After plastering, the cover plate 19 may be attached to the box 10 with screws 20 which pass into the ears 10$^C$.

I claim:

A device for supporting an outlet box or receptacle having a pair of comparatively large openings in each of the side walls thereof, comprising a separate bracket for supporting such box or receptacle in spaced relation from a vertical support, said bracket having a pair of elongated openings therein, said elongated openings being adapted to register with a pair of said wall openings, a plate member adapted for positioning within said box or receptacle and having a pair of openings adapted to register with said elongated openings in said bracket, and means extending through said openings in said bracket and in said plate member for supporting said box or receptacle on said bracket.

In witness whereof I affix my signature.

BEAUMONT C. PAINE.